US011916899B1

(12) United States Patent
Fletcher et al.

(10) Patent No.: US 11,916,899 B1
(45) Date of Patent: Feb. 27, 2024

(54) SYSTEMS AND METHODS FOR MANAGING ONLINE IDENTITY AUTHENTICATION RISK IN A NUANCED IDENTITY SYSTEM

(71) Applicant: Yahoo Ad Tech LLC, Dulles, VA (US)

(72) Inventors: George Fletcher, Round Hill, VA (US); Jonathan Hryn, Cary, NC (US); Lovlesh Chhabra, San Ramon, CA (US); Deepak Nayak, Santa Clara, CA (US)

(73) Assignee: Yahoo Assets LLC, New York, NY (US)

( * ) Notice: Subject to any disclaimer, the term of this patent is extended or adjusted under 35 U.S.C. 154(b) by 145 days.

(21) Appl. No.: 16/585,358

(22) Filed: Sep. 27, 2019

(51) Int. Cl.
 *H04L 9/40* (2022.01)
(52) U.S. Cl.
 CPC ...... *H04L 63/0861* (2013.01); *H04L 63/0876* (2013.01); *H04L 63/102* (2013.01)
(58) Field of Classification Search
 None
 See application file for complete search history.

(56) References Cited

U.S. PATENT DOCUMENTS

| | | | | |
|---|---|---|---|---|
| 8,699,800 | B1 * | 4/2014 | Chau ................. | G06F 16/58 382/201 |
| 9,203,860 | B1 * | 12/2015 | Casillas ............. | G06F 21/46 |
| 9,519,682 | B1 * | 12/2016 | Pujara ................ | H04H 20/28 |
| 10,432,605 | B1 * | 10/2019 | Lester ................ | G06F 21/552 |
| 10,891,372 | B1 * | 1/2021 | Shahbazi ............ | G06F 21/35 |
| 2006/0035707 | A1 * | 2/2006 | Nguyen ............. | G07F 17/323 463/29 |
| 2007/0199053 | A1 * | 8/2007 | Sandhu .............. | H04L 9/0825 726/4 |
| 2012/0233665 | A1 * | 9/2012 | Ranganathan ....... | G06F 21/51 726/4 |
| 2014/0208386 | A1 * | 7/2014 | Sama ................. | H04L 63/14 726/4 |
| 2018/0060562 | A1 * | 3/2018 | Waltermann ........ | G06F 21/31 |
| 2018/0248863 | A1 * | 8/2018 | Kao ................... | H04L 63/102 |
| 2019/0034625 | A1 * | 1/2019 | Ford .................. | G06F 21/552 |

OTHER PUBLICATIONS

Slawek Ligier, "Threat vectors—what are they and why do you need to know them?", found at https://blog.barracuda.com/2016/11/17/threat-vectors-what-are-they-and-why-do-you-need-to-know-them (Year: 2016).*
Edward G. Amoroso, 10—Awareness, Cyber Attacks, pp. 179-192, ISBN 9780123849175. (Year: 2011).*

* cited by examiner

*Primary Examiner* — Piotr Poltorak
(74) *Attorney, Agent, or Firm* — Bookoff McAndrews, PLLC

(57) ABSTRACT

Disclosed are systems and methods for managing online identity authentication risk in a nuanced identity system. For example, a method may include receiving a request by a user for a transaction on an electronic platform; determining a risk associated with the requested transaction; determining a current level of assurance associated with the user on the electronic platform; determining that the risk exceeds the current level of assurance; adjusting the current level of assurance such that the adjusted level of assurance exceeds the risk; and executing the requested transaction on the electronic platform after adjusting the current level of assurance.

20 Claims, 6 Drawing Sheets

SYSTEMS AND METHODS FOR MANAGING ONLINE IDENTITY AUTHENTICATION RISK IN A NUANCED IDENTITY SYSTEM

DETAILED DESCRIPTION

Technical Field

The present disclosure relates to managing identity authentication on the Internet and, more specifically, to techniques for managing online identity authentication risk in a nuanced identity system.

BACKGROUND

Conventional methods of identity management are focused on securely identifying and authenticating an entity, e.g., person or device, and managing that entity in largely binary ways, e.g., determining whether the user has been authenticated or not.

However, today's complicated user experiences necessitates performing only as much authentication and/or authorization processes needed to cover the risk of a given transaction. That is, the risk of each transaction may be different and hence different methods of authentication and/or authorization may be needed to ensure that the risk is covered. Therefore, it may be desirable to provide a system and method directed to new techniques for managing risk in a nuanced identity system.

SUMMARY OF THE DISCLOSURE

Embodiments of the present disclosure include systems and methods for managing risk in a nuanced identity system.

According to certain embodiments, a computer-implemented method is disclosed. The computer-implemented method may include: receiving, by one or more processors, a request by a user for a transaction on an electronic platform; determining, by the one or more processors, a risk associated with the requested transaction; determining, by the one or more processors, a current level of assurance associated with the user on the electronic platform based on one or more of: (i) an identity vector, (ii) an authentication vector, (iii) a recovery strength vector, (iv) a session confidence vector, and (v) a member value vector; determining, by the one or more processors, that the risk exceeds the current level of assurance; adjusting, by the one or more processors, the current level of assurance such that the adjusted level of assurance exceeds the risk, wherein adjusting the current level of assurance comprises adjusting one or more of: (i) the identity vector, (ii) the authentication vector, (iii) the recovery strength vector, (iv) the session confidence vector, and (v) the member value vector; and executing, by the one or more processors, the requested transaction on the electronic platform after adjusting the current level of assurance.

In accordance with another embodiment, a computer system is disclosed. The computer system may include: a data storage device storing processor-readable instructions; and a processor configured to execute the instructions to perform a method. The method may include receiving a request by a user for a transaction on an electronic platform; determining a risk associated with the requested transaction; determining a current level of assurance associated with the user on the electronic platform based on one or more of: (i) an identity vector, (ii) an authentication vector, (iii) a recovery strength vector, (iv) a session confidence vector, and (v) a member value vector; determining that the risk exceeds the current level of assurance; adjusting the current level of assurance such that the adjusted level of assurance exceeds the risk, wherein adjusting the current level of assurance comprises adjusting one or more of: (i) the identity vector, (ii) the authentication vector, (iii) the recovery strength vector, (iv) the session confidence vector, and (v) the member value vector; and executing the requested transaction on the electronic platform after adjusting the current level of assurance.

In accordance with another embodiment, a non-transitory computer-readable medium is disclosed. The non-transitory computer-readable medium may contain instructions that, when executed by a processor, cause the processor to perform a method including: receiving a request by a user for a transaction on an electronic platform; determining a risk associated with the requested transaction; determining a current level of assurance associated with the user on the electronic platform based on one or more of: (i) an identity vector, (ii) an authentication vector, (iii) a recovery strength vector, (iv) a session confidence vector, and (v) a member value vector; determining that the risk exceeds the current level of assurance; adjusting the current level of assurance such that the adjusted level of assurance exceeds the risk, wherein adjusting the current level of assurance comprises adjusting one or more of: (i) the identity vector, (ii) the authentication vector, (iii) the recovery strength vector, (iv) the session confidence vector, and (v) the member value vector; and executing the requested transaction on the electronic platform after adjusting the current level of assurance.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
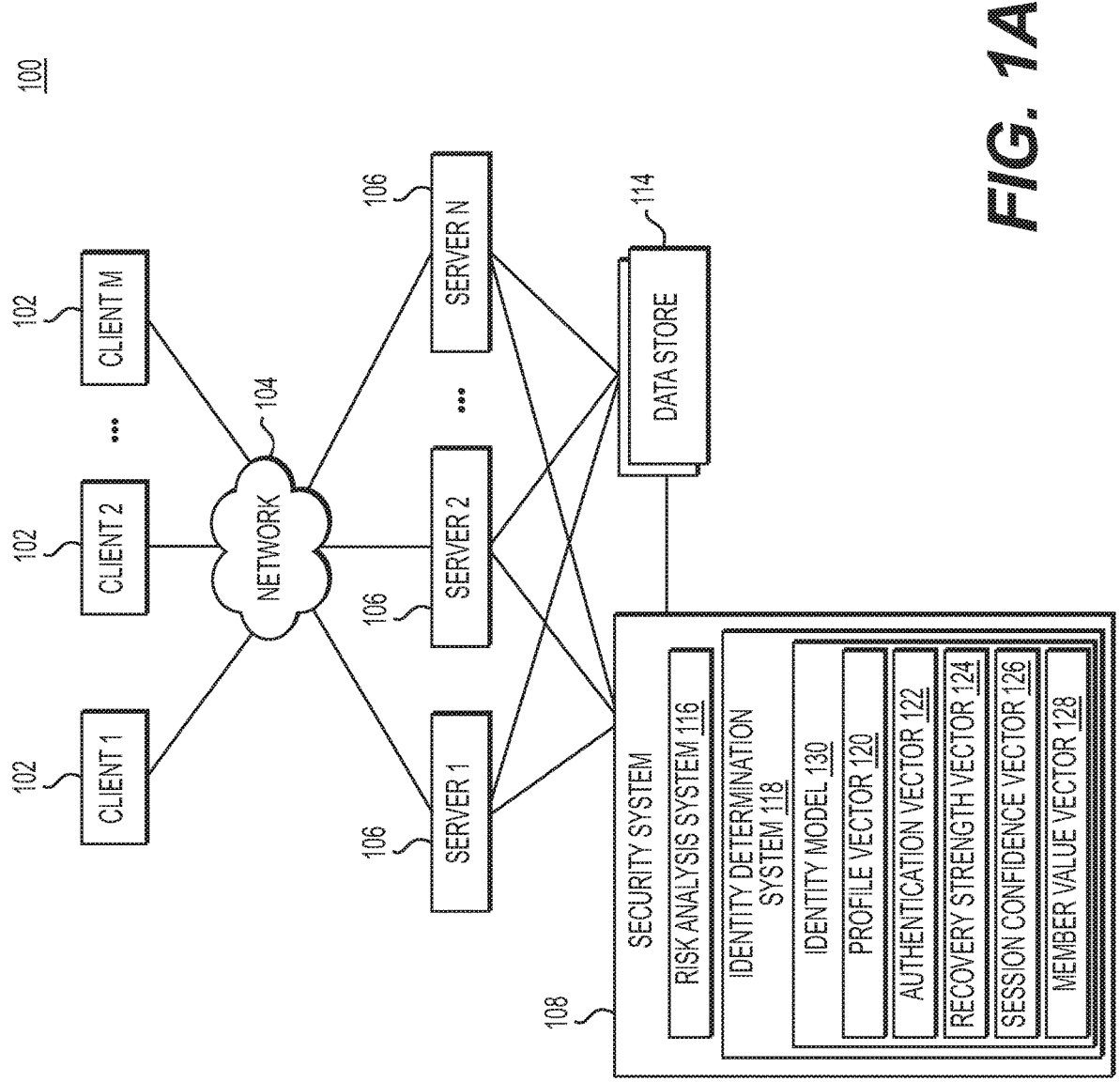
FIG. 1A depicts a schematic diagram illustrating an example of a computer network and environment within which the computer systems and methods disclosed herein are implemented according to some embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems of managing online identity authentication risk in a nuanced identity system. Specifically, and without limitation, the present disclosure describes systems and methods for providing the necessary security to cover the risk associated with a certain transaction. That is, the present disclosure focuses on risk as a key factor of an identity determination system (also referred to as an identity platform) such that the identity determination system only needs to secure the user commensurate with the risk of any transaction requested by the user. In some embodiments, the identity determination system may track an identity of a user (also referred to as an identity model) across five different vectors, where the identity model for various users may have different values for each of the five different vectors.

A product and/or service may define the risk of a requested transaction. The combination of the risk of the requested transaction and the identity model for the requesting user may allow the identity determination system to provide improved user experiences. In some embodiments, the five vectors may include: (1) a profile vector; (2) an authentication vector; (3) a recovery strength vector; (4) a session confidence vector; and (5) a member value vector. The profile vector may indicate a completeness of identity profile attributes. The authentication vector may indicate how strongly the user may be authenticated. The recovery strength vector may indicate how likely it is that the user may recover his or her identity, e.g., user profile. The session confidence vector may indicate how confident a current session represents the user who has initiated the session. The member value vector may indicate how valuable the user may be to the product and/or service, and similarly, how valuable the product and/or service may be to the user.

The identity determination system may track a number of features for each of the five vectors to provide a gradient of levels in each respective vector. For example, the identity determination system may track behavioral recognition of a browser over a predetermined period of time and allocate an authentication strength of 0.5 to the tracked behavioral recognition of the browser. Leaving a comment on a website may have a risk of 0.5. In such instances, the authentication strength of the behavioral recognition of the browser may cover the risk associated with leaving a comment on the website. Accordingly, the tracked feature for the authentication vector, e.g., the behavioral recognition, may provide sufficient authentication strength for a user to leave a comment on a website without further authentication. As another example, accessing an email may have a risk larger than that of leaving a comment on a website. As such, the behavioral recognition of the browser may be insufficient for the user to access the email. In some embodiments, an email code challenge may be allocated an authentication strength of 0.9. Accordingly, the combination of a successful email code challenge and the browser recognition may provide a security strength of 1.4 for the user, thereby providing a sufficient security strength for the user to access the email upon a successful email code challenge. Similar tracking methods may be applied to any combination of the five vectors described above in other embodiments. In some embodiments, a level of assurance for a user to perform one or more requested transactions may be determined based on the strengths associated with each tracked feature of the five vectors.

The embodiments disclosed herein provide advantageous user experience features and capabilities such as (1) recognition (i.e., seamless authentication), (2) progressive registration, (3) privacy (through the collection of only as much data as required for a certain transaction request), and (4) one or more methods of recovery for valued users. Embodiments of the present disclosure will now be described with respect to FIGS. 1A-5.

FIG. 1A shows a block diagram of an exemplary electronic communications system 100 for implementing embodiments of the present disclosure, or aspects thereof. System 100 may include one or more clients 102 (e.g., Client 1, Client 2, . . . Client m). Clients 102 may be implemented with devices, and/or applications running thereon. By way of example, clients 102 may include personal computers, laptops, tablet computers, personal digital assistants, mobile telephones, smartphones, pagers, and/or other types of electronic communication devices. Clients 102 may be configured to communicate to and/or through network 104. In the context of the current disclosure, client 102 may be referred to as a user using one or more of the aforementioned devices and/or applications. In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, clients 102 may be configured to initiate electronic transaction requests. For example, electronic transaction requests may include receiving or initiating e-mail or other electronic communications, such as instant messaging, chat, text messaging, SMS messages, pager communications, blog posts, microblog posts, news items, etc. The electronic transaction requests may be generated by clients 102 and transmitted through network 104 to appropriate servers, such as, for example, servers 106.

Servers 106 may include one or more servers (e.g., Server 1, Server 2, . . . Server n) configured to interact with the network 104, one or more data stores 114, and a security system 108. In addition, consistent with some embodiments, servers 106 may be implemented as a server, a server system comprising a plurality of servers, or a server farm comprising a load balancing system and a plurality of servers. Servers 106 may be hardware, software, or a combination thereof. In some embodiments, a product and/or service may be provided to the client 102 via the servers 106. For example, the servers 106 may be web and/or e-mail servers.

The security system 108 may include a risk analysis system 116 and an identity determination system 118 (also referred to as an identity platform). While the current disclosure describes the risk analysis system 116 and the identity determination system 118 as included in the security system 108, it is understood that the risk analysis system 116 and the identity determination system 118 may be included in the system 100 as separate components in alternative embodiments.

Figure 1B:
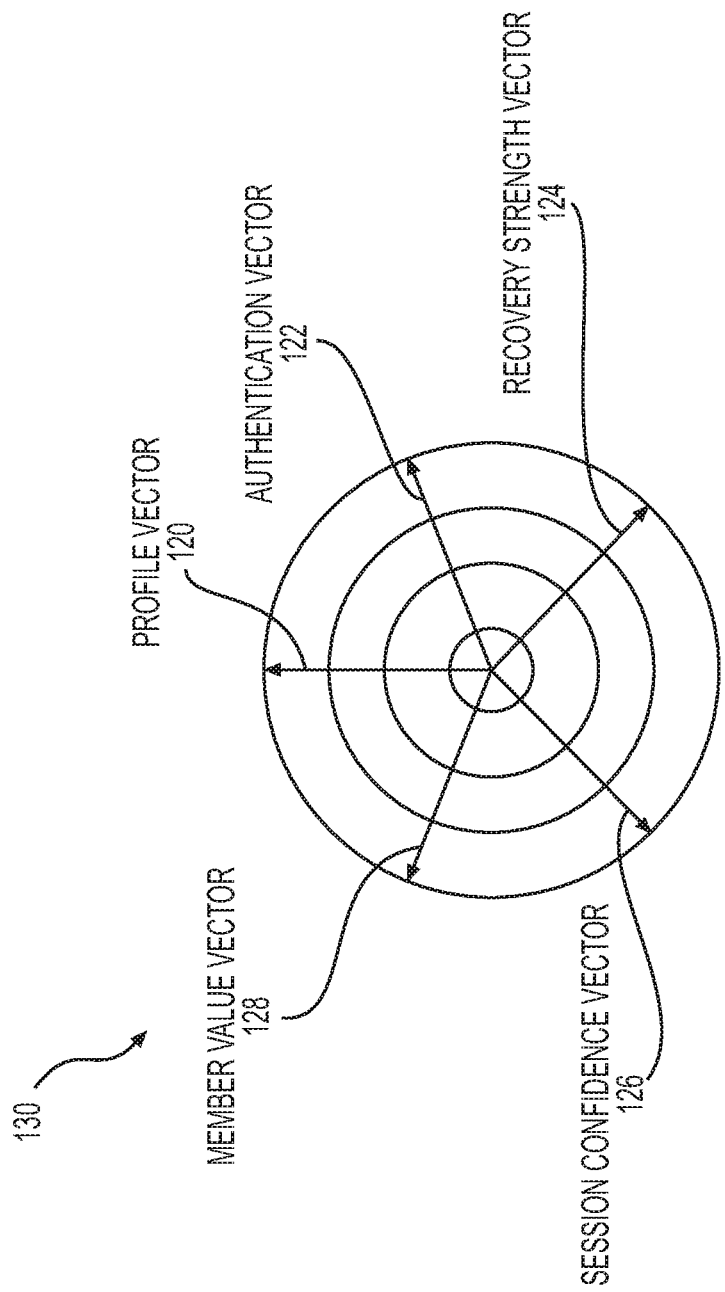
FIG. 1B depicts an identity model according to some embodiments.

The risk analysis system 116 may determine a risk associated with transaction requests generated by the clients 102. The identity determination system 118 may generate an identity model 130 including a profile vector 120, an authentication vector 122, a recovery strength vector 124, a session confidence vector 126, and a member value vector 128, as shown in FIG. 1B. The identity determination system 118 may utilize the identity model 130 to determine a level of assurance for each client 102 associated with a transaction request based on at least one or more of the profile vector 120, the authentication vector 122, the recovery strength vector 124, the session confidence vector 126, and the member value vector 128, as will be described in further detail below.

In some embodiments, the profile vector 120 may be based on a completeness of a user profile for a client 102 associated with a transaction request. The identity determination system 118 may generate and/or receive the user profile for the client 102. In some embodiments, identity determination system 118 may generate a global unique identifier (GUID) for the generated and/or received user profile for the client 102. In some embodiments, the user profile for the client 102 may be based on information provided by the client 102. In some embodiments, the user profile may include any combination of additional attributes such as: (i) first/last name, (ii) date of birth, (iii) gender, (iv) postal code, etc. Such attributes may be collected all at once or progressively through multiple interactions, e.g., multiple transaction requests, with the client 102. Each collected attribute included in the user profile may be allocated a strength. For example, the first/last name attribute may be allocated a strength of 0.5 and the date of birth attribute may be allocated a strength of 0.5. Accordingly, a user profile including the first/last name and date of birth attributes may have a combined strength of 1.0. In some embodiments, the profile vector 120 may be based on the combined strength of the user profile. In the context of the current disclosure, the combined strength of the user profile may also be referred to as the completeness of the user profile.

The one or more servers 106 and/or the identity determination system 118 may collect additional attributes associated with the client 102. In some embodiments, the identity determination system 118 may determine whether a transaction request requires one or more specific attributes included in the user profile. In such embodiments, the identity determination system 118 may determine whether the user profile includes such specific attributes. If the identity determination system 118 determines that the specific attributes are not included in the user profile, the identity determination system 118 may obtain the specific attributes from the client 102 before the transaction request is executed. For example, a transaction request generated by the client 102 may require a date of birth in order to process. In such instances, the identity determination system 118 may be configured to prompt the client 102 to provide the necessary information.

In some embodiments, the authentication vector 122 may be based on one or more authentication methods available to the client 102. In some embodiments, the one or more authentication methods may include a one time password (OTP) sent to the client 102, e.g., a user's phone or email. In some embodiments, the one or more authentication methods may include a two step verification (2SV) process. As such, the one or more authentication methods may include a first authentication method, e.g., the two step verification process, that provides a relatively higher security than a second authentication method, e.g., the OTP method. A strength may be assigned to each authentication method in accordance to the level of security. For example, a strength of 2.0 may be allocated to the two step verification process and a strength of 1 may be allocated to the OTP method. In some embodiments, a certain authentication method may provide a sufficient level of security for a certain transaction request initiated by the client 102, while insufficient for other transaction requests. For example, a single weak authentication method may be sufficient to leave a comment on a blog post, but may be insufficient to obtain a user's mailbox or purchase a subscription. In such embodiments, the security system 108 may determine that the client 102 needs to perform one or more additional authentication methods in order to execute a transaction request.

In some embodiments, the authentication vector 122 for a client 102 may be based on the combined strength of the available authentication methods. That is, multiple authentication methods may be combined to increase the authentication strength of the client 102. In some embodiments, contextual information may be utilized to increase the authentication strength of a client 102. Contextual information may include any additional information regarding the client 102 available to the identity determination system 118. For example, contextual information may include an associated IP address, a JA3 fingerprint, and behavioral biometrics collected on the client 102, e.g., user device, and provided with the transaction request, etc. In the context of the current disclosure, the JA3 fingerprint may refer to a Secure Sockets Layer (SSL) and/or Transport Layer Security (TLS) client fingerprint, as will be understood by a person of ordinary skill in the art. A non-limiting list of exemplary authentication methods and allocated strengths is shown in Table 1 below:

TABLE 1

| Authentication Method | Strength |
| --- | --- |
| Browser Cookie | 0 |
| Browser Cookie + good B:IP pair | 0.5 |
| OTP to verified Phone number | 1 |
| OTP to verified Email address | 1 |
| Password | 1.5 |
| Social Network Login linked to user profile | 1 |
| Account Key | 2 |
| 2SV enabled | 2 |
| Password + good user:IP pair | 1.75 |
| Location history | 0.5 |

As shown in Table 1 above, the identity determination system 118 may determine the authentication strength of the client 102 based on one or more authentication methods. For example, the identity determination system 118 may determine a browser cookie used by the client 102. The use of the browser cookie may be allocated a strength of zero, as shown above. However, if the identity determination system 118 detects an IP address consistently associated with the client 102 over a period of time (also referred to as a recognized IP address) in addition to the browser cookie, the identity determination system 118 may allocate a combined authentication strength of 0.5 to the client 102. More specifically, the identity determination system 118 may identify a browser used for activity by the client 102 and a set of recognized IP addresses mapped to the browser and used for the activity. The activity may be separately monitored and evaluated to determine whether the activity increases an authentication strength for the client 102. In some embodiments, a browser profile associated with the client 102 may be generated based on the authentication strength associated with the evaluated activity and identified browser.

As another example, the identity determination system 118 allocate a strength of 1.75 for a client 102 that utilizes a password in addition to a determination that a monitored activity of the client 102 using a recognized IP address increases the authentication strength, e.g., the combination of the password and the good user:IP pair. More specifically, the identity determination system 118 may monitor the activity of the client 102 once the client 102 has logged in using the password. The identity determination system 118 may determine whether the monitored activity of the client 102 approximates to the activity of a real human user (as opposed to activity generated by bot traffic). Accordingly, the identity determination system 118 may allocate an authentication strength of 1.75 to the client 102 based on the use of a password, a determination that the client 102 is a real human user, and the recognized IP address. Further details with respect to the monitored activity of the client 102 is further described below with reference to the member value vector. The list of exemplary authentication methods and allocated strengths shown above in Table 1 are for explanation purposes only, and it is understood that different types of authentication methods may be utilized and allocated strengths may vary in alternative embodiments.

In some embodiments, products and/or services offered via the servers 106 may define the required authentication strength for their service. The identity determination system 118 may obtain the required authentication strength for the products and/or services and prompt the client 102 to perform one or more methods of authentications necessary to achieve the required authentication strength. In some embodiments, once such required authentication strength has been set for a client 102 in association with a product and/or service, the client 102 may be required to authenticate to that authentication strength in subsequent transaction requests related to that product and/or service.

In some embodiments, the recovery strength vector 124 may be based on one or more recovery methods available to the client 102. More specifically, the recovery strength vector 124 may be based on a likelihood that the client 102 will be able to recover their identity should they lose access to the products and/or services via available authentication methods. In some embodiments, the recovery strength vector 124 may be based on a number of communication channels for the client 102, whether the client 102 has a purchased subscription (e.g., the client 102 may recover their identity based on the payment method) for a product and/or service offered via the servers 106, strength of the client's 102 access behavioral pattern (e.g., one or more IP addresses consistently associated with the client 102 over a period of time, a browser cookie associated with the client 102, location history of the client 102, a unique user device associated with the client 102, etc.), etc. In some embodiments, the product and/or service may require a client 102 to have a higher recovery strength vector 124 in order to prevent a situation in which the client 102 loses access to the product and/or service. In such embodiments, the identity determination system 118 may determine one or more methods of recovery for the client in association with the product and/or service. For example, the one or more methods of recovery may include any combination of a verified phone number, a verified email address, a social network login linked to a user profile of the client 102, a stored payment method, etc. In some embodiments, a recovery strength may be allocated to each of the one or more methods of recovery. In some embodiments, the importance of the product and/or service to a user may be evaluated in order to minimize the impact of the loss of access to the product and/or service for the user. That is, one or more recovery methods may be determined for the user based on the importance of the product and/or service to the user.

In some embodiments, the session confidence vector 126 may be based on how confident the identity determination system 118 may be that the correct user has been authenticated. The session confidence vector 126 may be based on a session confidence value determined by the identity determination system 118. For example, the identity determination system 118 may recognize a user consistently logging in from a device that has its own private/public key pair and accessing the system using a specific IP address. In such instances, the identity determination system 118 may determine a relatively high session confidence value indicating that the user using the device and specific IP address to log in is the real user and that additional requests for credentials may not be needed.

The products and/or services provided via the servers 106 may determine the risk of a given action, e.g., a transaction request, against the session confidence value to evaluate whether to process the given action. For example, a relatively low risk action such as leaving a comment on a blog may not require a high level of confidence, while a relatively high risk action such as sending a large number of emails might. As an extension of the example, the identity determination system 118 may check a current session confidence value for the client 102 and determine that the current session confidence value is not sufficient to send a large number of emails. Upon a determination that the current session confidence value for the client 102 is insufficient, the identity determination system 118 may prompt the client 102 to provide additional information to improve the session confidence value. In some embodiments, the identity determination system 118 may prompt the client 102 to provide behavioral biometrics on a user device, etc.

In some embodiments, the identity determination system 118 may improve the session confidence vector 126 without an explicit interaction by the client 102. For example, the identity determination system 118 may recognize a recent transaction made by the client 102 from a predetermined location. The recent transaction by client 102 from the predetermined location may improve the session confidence value of the client 102 without the client 102 having to actively provide additional information. This capability of the identity determination system 118 to improve a current session confidence value based on implicit information about the client 102 enables more capabilities to the client 102 without having to challenge, e.g., explicitly prompt the client for additional information, while still ensuring the security of the client 102 and minimizing risk to the product and/or service provider. The session confidence value may decay over time unless additional events, e.g., additional explicit and/or implicit information from the client 102, improves the session confidence value. As such, the session confidence vector 126 may be referred to as a type of continuous authentication.

In some embodiments, the member value vector 128 may be based on the value of the client 102. The value of the client 102 may be based on whether the client 102 is a frequent consumer of the product and/or service provided via the servers 106. For example, the value of the client 102 may be high if the client 102 is a frequent customer. Similarly, the value of the product and/or service may be valuable to the client 102 if the client is a frequent consumer of the product and/or service. In some embodiments, the value of the client 102 may be categorized as follows: (1) infrequent, (2) moderate, (3) engaged, and (4) subscriber. In some embodiments, the member value vector 128 may be based on whether the client 102 is a human user. More specifically, the identity determination system 118 may determine whether the client 102 is a human user based on monitored activity of the client 102. In some instances, malicious users and/or bots may generate malicious or fraudulent traffic on the one or more servers 106. Malicious users and/or bots may drive up hits, visitors, or ad views/clicks for various purposes. For example, malicious bots may interact with advertisements to generate additional ad revenues for website owners or ad networks. Accordingly, the identity determination system 118 may assign a high member value vector 128 for a client 102 based on a determination that the client 102 is indeed a human user. In some embodiments, the identity determination system 118 may assign a low member value vector 128 for the client 102 based on a determination that the client 102 is a malicious user and/or bot.

The importance of whether or not the client 102 is capable of recovering their account may become increasingly important. Accordingly, a client 102 with a high member value vector 128 may need a high recovery strength vector in some embodiments. In some embodiments, the member value vector 128 may be utilized in assessing the recovery strength vector 124. For example, the member value vector 128 may be utilized in determining priority in call queues for calls relating to recovery methods.

In certain embodiments, servers 106 may also be configured to interact with a data store 114. The data store 114 may include one or more logically and/or physically separate databases configured to store data. The data stored in data store 114 may be received from servers 106, from the security system 108, and/or from any entity on the network 104. In some embodiments, the identity model 130 including one or more of the profile vector 120, the authentication vector 122, the recovery strength vector 124, the session confidence vector 126, and the member value vector 128 may be stored in the data store 114. The data stored in the data store 114 may take various forms including, but not limited to, account names, e-mails, instant messages, chat messages, text messages, SMS messages, pager communications, blog posts, news items, addresses, account names or other identifiers, and other electronic communications, user-generated content, or any combination thereof.

In some embodiments, security system 108 and/or the data store 114 may be implemented using a single computer, server, and/or network element. The security system 108 and/or the data store 114 may also be implemented on one or more servers 106. In other embodiments, the data store 114 and/or data stored on security system 108 may be maintained in a network attached storage device, in a storage area network, or combinations thereof, etc. Furthermore, data stored on the security system 108 and/or the data store 114 may be maintained and queried using numerous types of database software and programming languages, such as SQL, MySQL, IBM DB2®, Microsoft Access@, PERL, C/C++, Java®, etc.

Although the above description describes clients and servers separately, clients may perform the role of servers and vice-versa. Additionally, clients 102 may have the same hardware components as servers 106. Furthermore, the embodiments of this disclosure may also be implemented on the same device serving both as a client and a server.

Referring back to the security system 108, the security system 108 may receive a transaction request and subsequently compare the associated risk determined by the risk analysis system 116 and the associated level of assurance determined by the identity determination system 118 according to some embodiments. The identity determination system 118 may progressively determine the level of assurance of the client 102 by tracking one or more transaction requests transmitted by the client 102 during a period of time. In some embodiments, the identity determination system 118 may adjust the level of assurance based on a comparison of the determined risk and the level of assurance.

To provide context for the identity determination system 118 and for the purpose of explanation, consider an exemplary scenario involving a user, Alfred, accessing via a client 102 an internet based sports website provided via servers 106. Alfred is a new user of the internet based sports website and is using the sports website to track the U.S. Women's Soccer team. Over the course of a month, Alfred visits the website from his mobile phone and laptop. As Alfred becomes more engaged, he decides to leave a comment on one of the stories on the website. Alfred enters his comment and clicks "submit." Alfred is asked to provide his email address and the comment is posted. A few days later, Alfred decides to save his favorite women's soccer team. At this point, Alfred is asked to provide and verify his email address. There is no need to set a password. Later in his user journey, Alfred decides to participate in a fantasy sports league. At this point, Alfred authenticates by providing a one-time-password sent to his email address and then is prompted to provide additional registration information like year of birth and mobile phone number to enable recovery of Alfred's user profile.

With reference to Alfred's consumption of content on the website, the identity determination system 118 may determine that no challenges may be required for Alfred's consumption of content regarding the U.S. Women's Soccer team. The identity determination system 118, however, may generate and maintain a behavioral user profile of Alfred based on Alfred's interactions. In some embodiments, the identity determination system 118 may determine whether Alfred is a real human user as opposed to a robot based on Alfred's interactions and patterns.

With reference to Alfred's submitted comment, over the course of a month that Alfred has been visiting the website, the identity determination system 118 may track Alfred's device, e.g., mobile device and/or laptop, and map the device to behaviors that are known to be good. The identity determination system 118 may determine that leaving a comment may be a low risk transaction. The identity determination system 118 then determines whether the accumulated information, e.g., tracked devices and/or behavior profile, about Alfred is sufficient to address the risk associated with leaving the comment. That is, the identity determination system 118 may determine a level of assurance for Alfred in order to address the risk associated with submitting the comment.

In some embodiments, the identity determination system 118 may ask for Alfred's email address to determine if Alfred is a new user or an existing user. If the identity determination system 118 determines that Alfred is an existing user, Alfred's tracked behavior profile may be compared with a predetermined behavior profile for Alfred stored in the data store 114. If the identity determination system 118 determines that Alfred is a new user, Alfred may be prompted to prove that he has ownership of the email address. Accordingly, Alfred's level of assurance based on the profile vector 120 and/or the authentication vector 122 according to some embodiments. Alfred's determined level of assurance may be compared with the risk associated with submitting the comment. If the determined level of assurance exceeds the associated risk, the comment may be submitted.

With reference to Alfred saving a favorite soccer team, saving personal information such as a favorite soccer team may have a higher risk than leaving a comment on a website. In such instances, additional information from Alfred may be necessary. Accordingly, the identity determination system 118 may prompt Alfred to verify his email address. If Alfred correctly verifies his email, then the level of assurance for Alfred may be sufficient to save his personal information. If Alfred types an email address that does not match the email address he had previously provided, alternative methods of authentication may be utilized in order to obtain the sufficient level of assurance. Accordingly, Alfred's level of assurance may be based at least on the authentication vector 122, among others, according to some embodiments.

With reference to Alfred participating in a fantasy sports league, participating in a fantasy sports league may contain an even higher risk than saving personal information such as a favorite soccer team. Accordingly, a higher level of assurance may be required in order for Alfred to participate in the fantasy sports league. In some embodiments, Alfred may be prompted to perform a method of authentication that has a relatively higher level of security and create multiple methods of recovery. The combined strength of the strong method of authentication and the multiple methods of recovery may provide a sufficient level of assurance such that Alfred may participate in the fantasy sports league. Accordingly, Alfred's level of assurance may be based at least on the authentication vector 122 and the recovery strength vector 124, among others, according to some embodiments.

Figure 2:
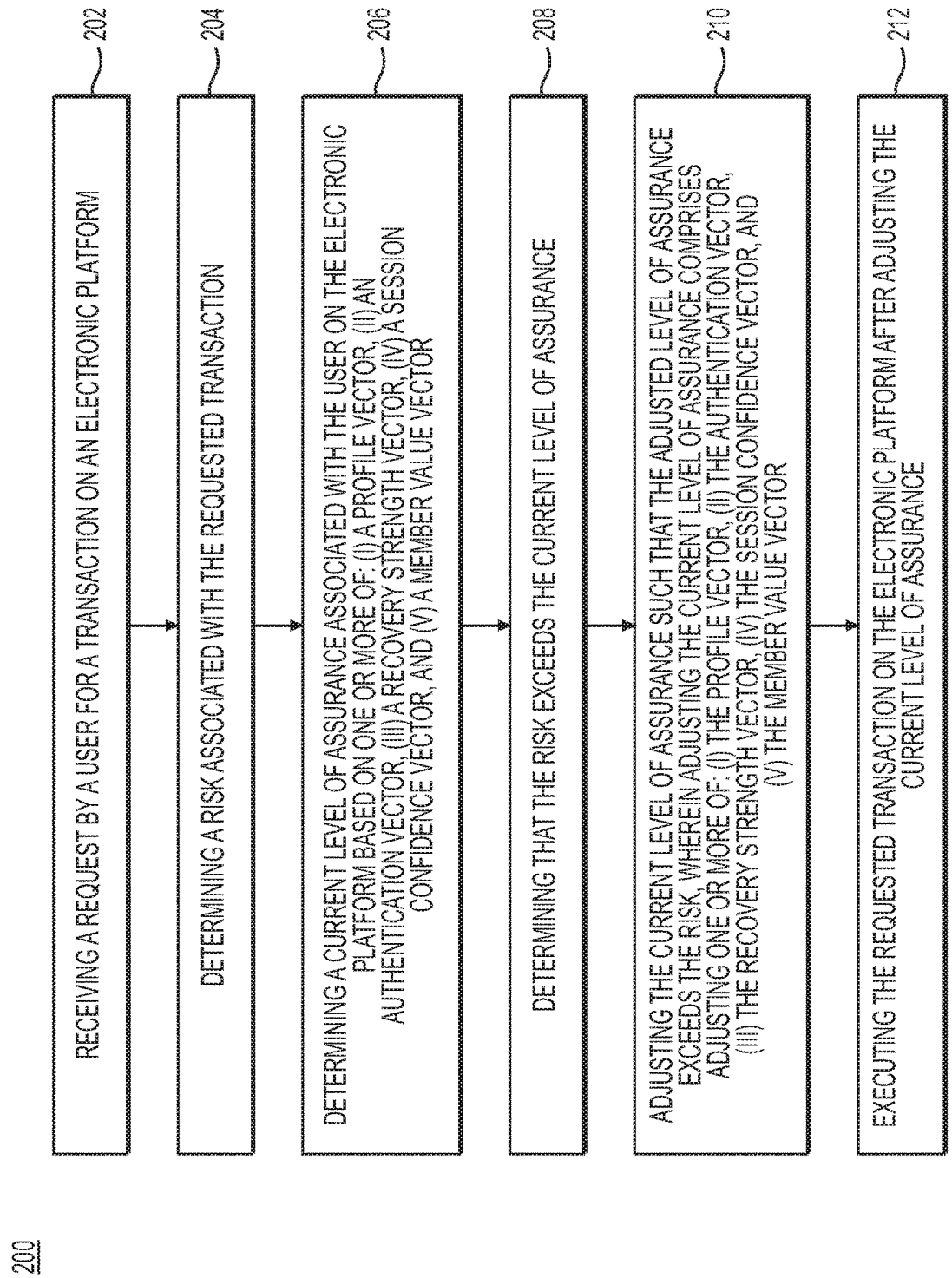
FIG. 2 depicts an exemplary method of managing online identity authentication risk in a nuanced identity system, according to exemplary embodiments of the present disclosure.

FIG. 2 depicts an exemplary method 200 of managing online identity authentication risk in a nuanced identity system, according to exemplary embodiments of the present disclosure. The method 200 includes step 202, in which one or more processors (e.g., one or more processors of the security system 108) may receive a request by a user for a transaction on an electronic platform. In step 204, the one or more processors may determine a risk associated with the requested transaction. In step 206, the one or more processors may determine a current level of assurance associated with the user on the electronic platform based on one or more of: (i) an identity vector, (ii) an authentication vector, (iii) a recovery strength vector, (iv) a session confidence vector, and (v) a member value vector. In step 208, the one or more processors may determine that the risk exceeds the current level of assurance. In step 210, the one or more processors may adjust the current level of assurance such that the adjusted level of assurance exceeds the risk, wherein adjusting the current level of assurance comprises adjusting one or more of: (i) the identity vector, (ii) the authentication vector, (iii) the recovery strength vector, (iv) the session confidence vector, and (v) the member value vector. In step 212, the one or more processors may execute the requested transaction on the electronic platform after adjusting the current level of assurance.

Figure 3:
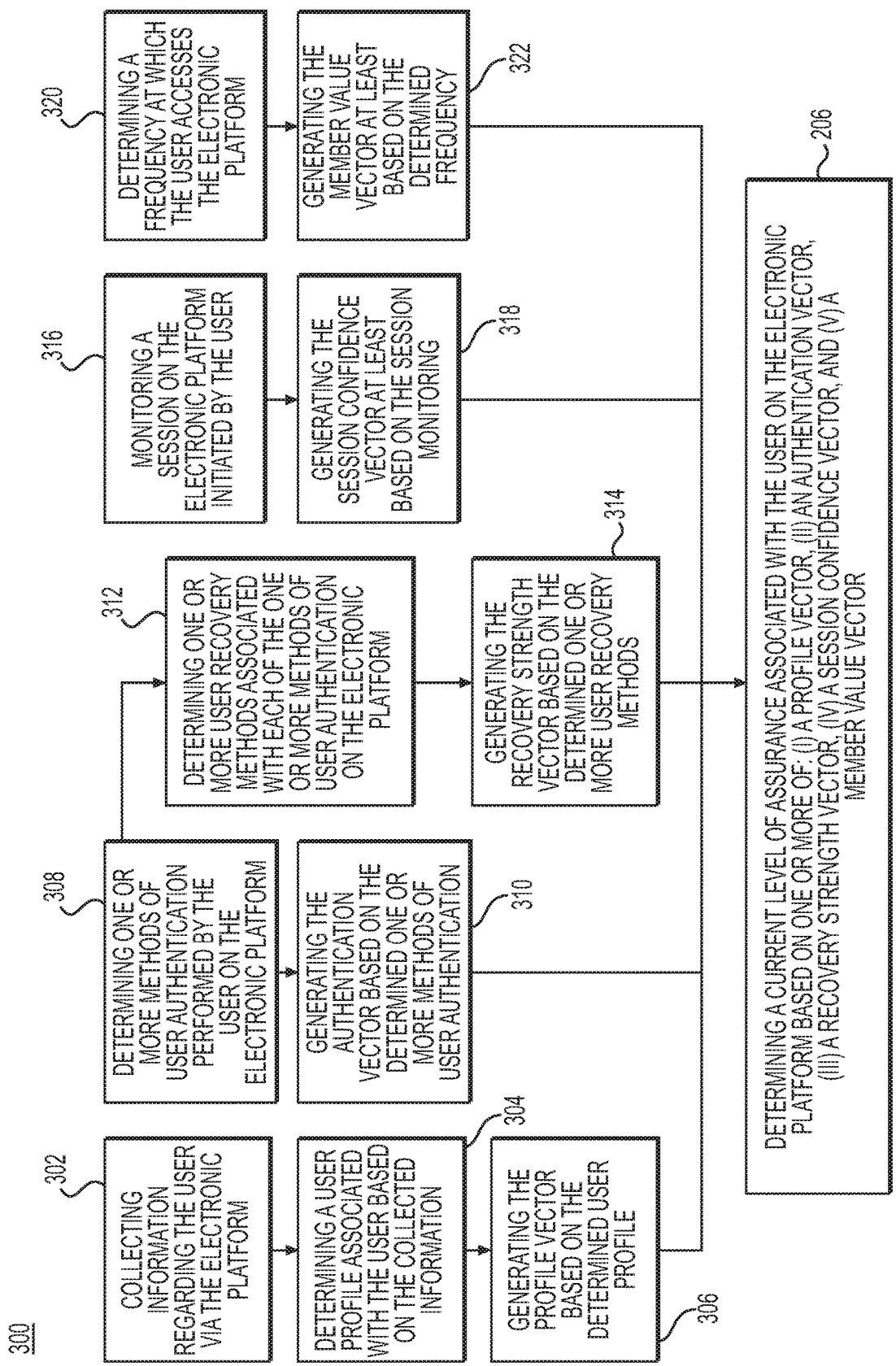
FIG. 3 depicts an exemplary method of determining a current level of assurance associated with a user on an electronic platform, according to exemplary embodiments of the present disclosure.

FIG. 3 depicts an exemplary method 300 of determining a current level of assurance associated with a user on an electronic platform, according to exemplary embodiments of the present disclosure. In step 302, information regarding the user may be collected via the electronic platform. For example, the electronic platform may collect one or more of: first/last name, date of birth, gender, postal code, etc. In step 304, a user profile associated with the user may be determined based on the collected information. In some embodiments, the electronic platform may generate a unique identifier for the user, e.g., a GUID, to identify the user for future requests. For example, the GUID may become the identifier for the user profile. In step 306, the profile vector may be generated based on the determined user profile.

In step 308, one or more methods of user authentication performed by the user on the electronic platform may be determined. For example, the determined one or more methods of user authentication may include one or more of: an OTP authentication method, a 2SV authentication method, a linked social network login, an account key, etc. In the context of the current disclosure, an account key may refer to a method of authentication that does not require a password. In step 310, the authentication vector may be generated based on the determined one or more methods of user authentication. In some embodiments, the one or more methods of user authentication include a first method of user authentication and a second method of user authentication. In such embodiments, generating the authentication vector based on the determined one or more methods of user authentications in step 310 may include: assigning a first weight to the first method of user authentication and a second weight to the second method of user authentication, and generating the authentication vector at least based on the assigned first and second weights.

In step 312, one or more user recovery methods associated with each of the one or more methods of user authentication on the electronic platform may be determined. For example, the determined one or more recovery methods may include one or more of: a verified phone number, a verified email address, a linked social network login, a stored payment method, etc. In step 314, the recovery strength vector may be generated based on the determined one or more user recovery methods.

In step 316, a session on the electronic platform initiated by the user may be monitored. In some embodiments, the session may be initiated by the user successfully performing one or more methods of user authentication on the electronic platform. In some embodiments, the request by the user for the transaction on the electronic platform may be made during the initiated session. In step 318, the session confidence vector may be generated at least based on the session monitoring. In some embodiments, generating the confidence vector in step 318 may include: (i) determining a session confidence metric for the session on the electronic platform, where the session confidence metric gradually decreases over time, (ii) monitoring the session on the electronic platform for incidents that increase the session confidence metric, where the incidents may include at least one or more of: determining a recognized IP address allocated to a user device used to access the electronic platform, and detecting biometric authentication on the user device during the session on the electronic platform, and (iii) generating the session confidence vector at least based on the monitored session confidence metric.

In step 320, a frequency at which the user accesses the electronic platform may be determined. In step 322, the member value vector may be generated at least based on the determined frequency. In some embodiments, one or more recovery methods associated with each of the one or more methods of user authentication on the electronic platform determined in step 312 may be further based on the generated member value vector.

As shown in FIG. 3, in step 206, the current level of assurance associated with the user on the electronic platform may be determined based on one or more of: (i) the identity vector, (ii) the authentication vector, (iii) the recovery strength vector, (iv) the session confidence vector, and (v) the member value vector.

Figures 4A, 4B:
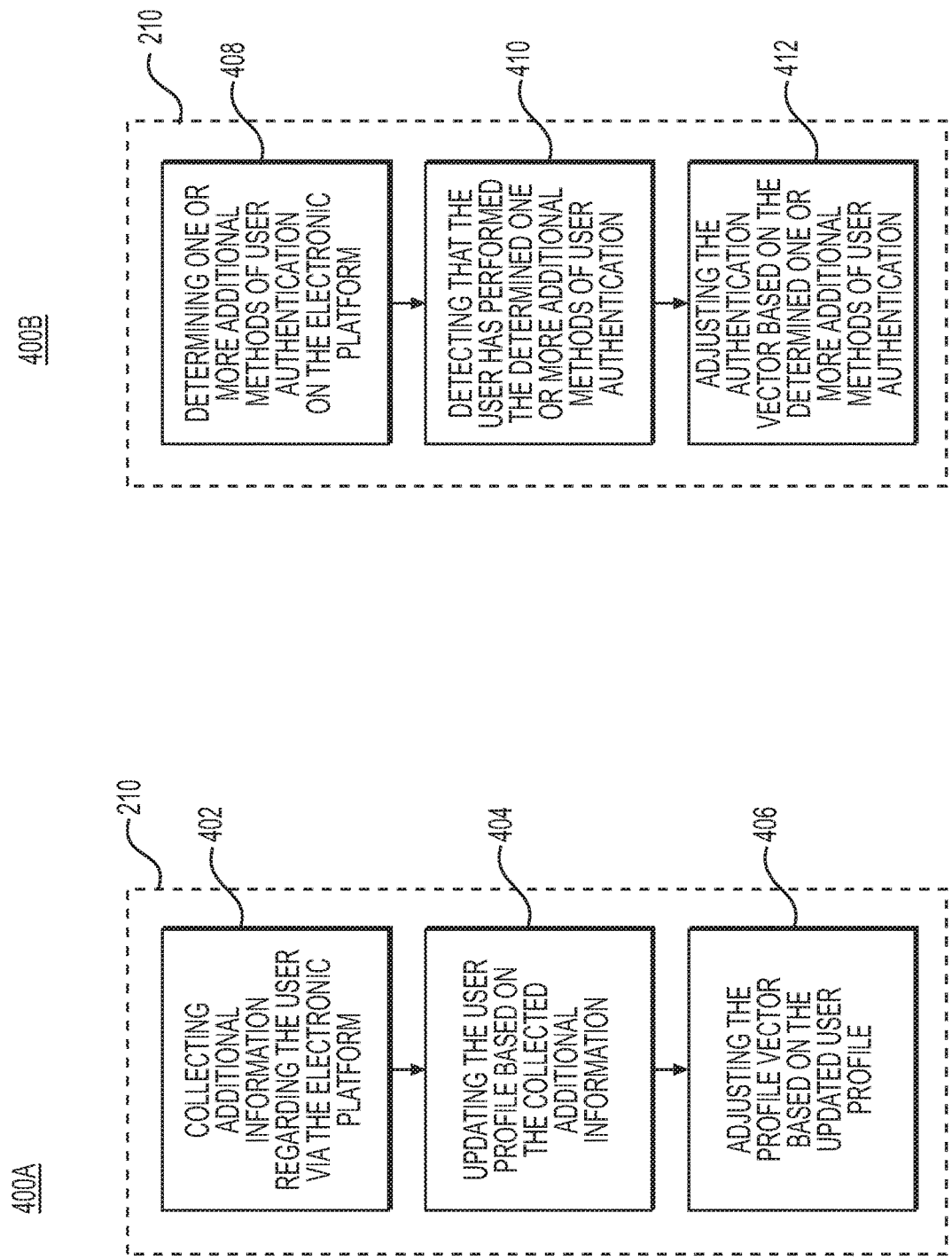
FIGS. 4A-4B depicts exemplary methods of adjusting the current level of assurance associated with the user on the electronic platform, according to exemplary embodiments of the present disclosure.

FIG. 4A depicts an exemplary method 400A of adjusting the current level of assurance associated with the user on the electronic platform, according to exemplary embodiments of the present disclosure. In step 402, additional information regarding the user may be collected via the electronic platform. In step 404, the user profile may be updated based on the collected additional information. In step 406, the profile vector may be adjusted based on the updated user profile.

FIG. 4B depicts an exemplary method 400B of adjusting the current level of assurance associated with the user on the electronic platform, according to exemplary embodiments of the present disclosure. In step 408, one or more additional methods of user authentication may be determined on the electronic platform. In step 410, the identity determination system 118 may detect that the user has performed the determined one or more additional methods of user authentication. In step 412, the authentication vector may be adjusted based on the determined one or more additional methods of user authentication.

Figure 5:
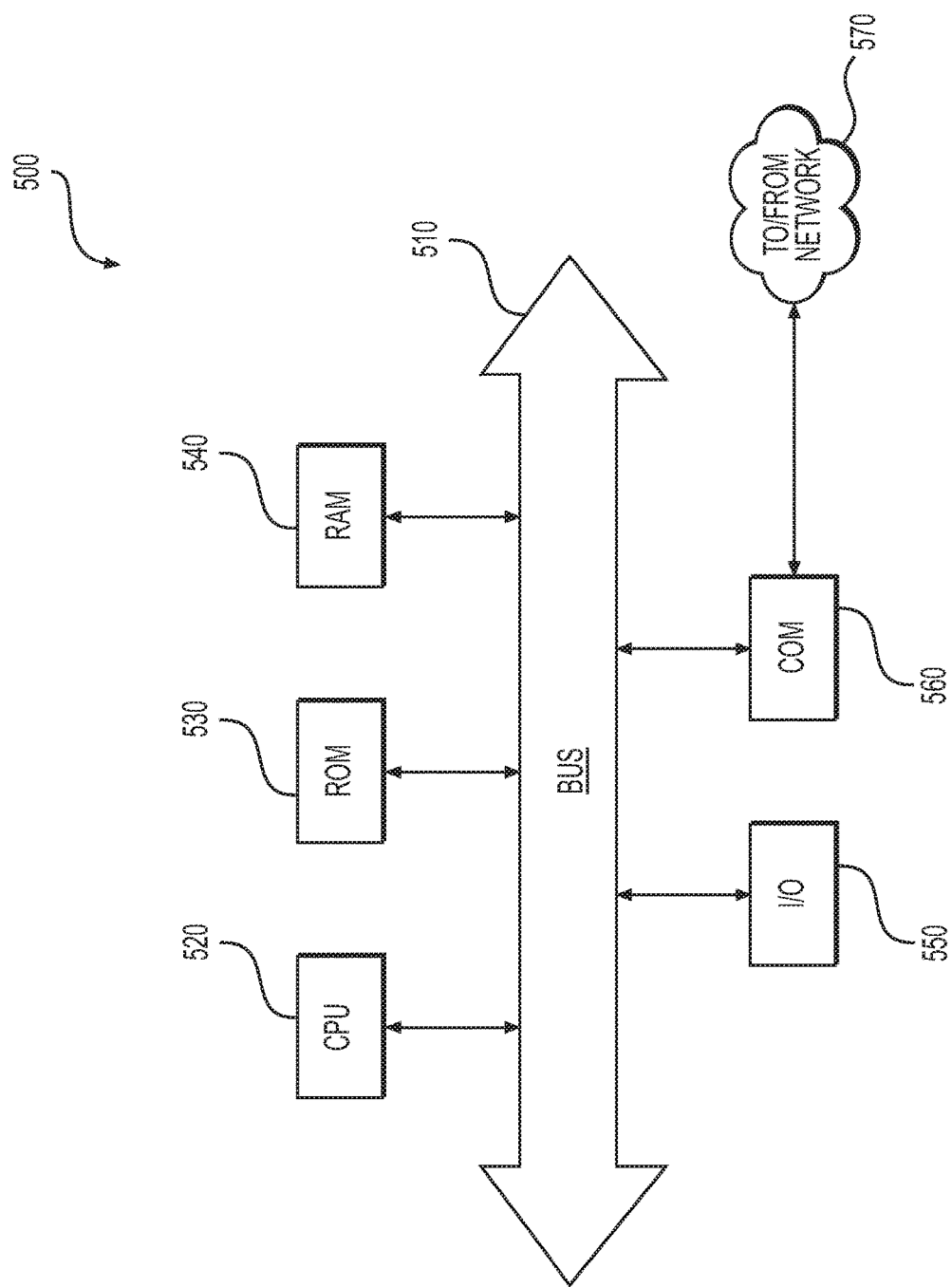
FIG. 5 is a simplified functional block diagram of a computer configured to function according to exemplary embodiments of the present disclosure.

FIG. 5 provides a functional block diagram illustration of general purpose computer hardware platforms. FIG. 5 illustrates a network or host computer platform 500, as may typically be used to implement a server, such as the one or more clients 102, servers 106, data stores 114, and the security system 108. It is believed that those skilled in the art are familiar with the structure, programming, and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage, and data storage for various data files to be processed and/or communicated by the platform such as ROM 530 and RAM 540, although the computer platform 500 often receives programming and data via network communications 570. The hardware elements, operating systems, and programming languages of such equipment are conventional in nature, and it is presumed that those skilled in the art are adequately familiar therewith. The computer platform 500 also may include input and output ports 550 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method comprising:
   receiving, by one or more processors, a request by a user for a transaction on an electronic platform;
   determining, by the one or more processors, a risk associated with the requested transaction;
   collecting information regarding the user via the electronic platform to determine a user profile;
   determining, by the one or more processors, a current level of assurance associated with the user based on a gradient level determined over a period of time for a profile vector, an authentication vector, and a recovery strength vector, wherein the profile vector is determined based on a user profile comprising user information;
   determining, by the one or more processors, that the risk exceeds the current level of assurance;
   adjusting, by the one or more processors, the current level of assurance such that the adjusted level of assurance exceeds the risk, wherein adjusting the current level of assurance comprises collecting additional information of the user, updating the user profile based on the collected additional information, and adjusting the identity vector based on the updated user profile; and
   after adjusting the current level of assurance, executing, by the one or more processors, the requested transaction on the electronic platform.

2. The method of claim 1, further comprising:
   determining one or more methods of user authentication performed by the user on the electronic platform; and
   generating the authentication vector based on the determined one or more methods of user authentication.

3. The method of claim 2, wherein the one or more methods of user authentication include a first method of user authentication and a second method of user authentication, and wherein generating the authentication vector based on the determined one or more methods of user authentications comprises:
   assigning a first weight to the first method of user authentication and a second weight to the second method of user authentication; and
   generating the authentication vector at least based on the assigned first and second weights.

4. The method of claim 2, wherein adjusting the current level of assurance such that the adjusted level of assurance exceeds the risk comprises:
   determining one or more additional methods of user authentication on the electronic platform;
   detecting that the user has performed the determined one or more additional methods of user authentication; and adjusting the authentication vector based on the determined one or more additional methods of user authentication.

5. The method of claim 1, wherein the recovery strength vector is based on a likelihood that the user can recover an identity of the user used for the transaction on the electronic platform.

6. The method of claim 1, further comprising:
monitoring a session on the electronic platform initiated by the user by successfully performing one or more methods of user authentication on the electronic platform, wherein the request by the user for the transaction on the electronic platform is made during the session; and
generating the session confidence vector at least based on the session monitoring.

7. The method of claim 6, wherein generating the session confidence vector at least based on the session monitoring comprises:
determining a session confidence metric for the session on the electronic platform, wherein the session confidence metric gradually decreases over time;
monitoring the session on the electronic platform for incidents that increase the session confidence metric, wherein the incidents include at least one or more of: determining a recognized IP address allocated to a user device used to access the electronic platform, and detecting biometric authentication on the user device during the session on the electronic platform; and
generating the session confidence vector at least based on the monitored session confidence metric.

8. The method of claim 1, further comprising:
determining a frequency at which the user accesses the electronic platform; and
generating the member value vector at least based on the determined frequency.

9. The method of claim 8, wherein the member value vector determines a priority in call queues for calls related to recovery methods.

10. The method of claim 1, wherein the recovery strength vector is based on one or more determined recovery methods, the recovery methods comprising a verified phone number, a verified email address, a linked social network login, and a stored payment method.

11. A computer system comprising:
a data storage device storing processor-readable instructions; and
a processor configured to execute the instructions to perform a method including:
receiving a request by a user for a transaction on an electronic platform;
determining a risk associated with the requested transaction;
collecting information regarding the user via the electronic platform to determine a user profile;
determining a current level of assurance associated with the user based on a gradient level determined over a period of time for a profile vector, an authentication vector, and a recovery strength vector, wherein the profile vector is determined based on a user profile comprising user information;
determining that the risk exceeds the current level of assurance;
adjusting the current level of assurance such that the adjusted level of assurance exceeds the risk, wherein adjusting the current level of assurance collecting additional information of the user, updating the user profile based on the collected additional information, and adjusting the identity vector based on the updated user profile; and
after adjusting the current level of assurance, executing the requested transaction on the electronic platform.

12. The computer system of claim 11, wherein the processor is further configured for:
determining one or more methods of user authentication performed by the user on the electronic platform; and
generating the authentication vector based on the determined one or more methods of user authentication.

13. The computer system of claim 12, wherein adjusting the current level of assurance such that the adjusted level of assurance exceeds the risk comprises:
determining one or more additional methods of user authentication on the electronic platform;
detecting that the user has performed the determined one or more additional methods of user authentication; and
adjusting the authentication vector based on the determined one or more additional methods of user authentication.

14. The computer system of claim 11, wherein the recovery strength vector is based on a likelihood that the user can recover an identity of the user used for the transaction on the electronic platform.

15. The computer system of claim 11, wherein the processor is further configured for:
monitoring a session on the electronic platform initiated by the user by successfully performing one or more methods of user authentication on the electronic platform, wherein the request by the user for the transaction on the electronic platform is made during the session; and
generating the session confidence vector at least based on the session monitoring.

16. The computer system of claim 15, wherein generating the session confidence vector at least based on the session monitoring comprises:
determining a session confidence metric for the session on the electronic platform, wherein the session confidence metric gradually decreases over time;
monitoring the session on the electronic platform for incidents that increase the session confidence metric, wherein the incidents include at least one or more of: determining a recognized IP address allocated to a user device used to access the electronic platform, and detecting biometric authentication on the user device during the session on the electronic platform; and
generating the session confidence vector at least based on the monitored session confidence metric.

17. The computer system of claim 11, wherein the processor is further configured for:
determining a frequency at which the user accesses the electronic platform; and
generating the member value vector at least based on the determined frequency.

18. The computer system of claim 11, wherein the recovery strength vector is based on one or more determined recovery methods, the recovery methods comprising a verified phone number, a verified email address, a linked social network login, and a stored payment method.

19. A non-transitory computer-readable medium containing instructions that, when executed by a processor, cause the processor to perform a method comprising:
receiving a request by a user for a transaction on an electronic platform;

determining a risk associated with the requested transaction;

collecting information regarding the user via the electronic platform to determine a user profile;

determining a current level of assurance associated with the user based on a gradient level determined over a period of time for a profile vector, an authentication vector, and a recovery strength vector, wherein the profile vector is determined based on a user profile comprising user information;

determining that the risk exceeds the current level of assurance;

adjusting the current level of assurance such that the adjusted level of assurance exceeds the risk, wherein adjusting the current level of assurance comprises collecting additional information of the user, updating the user profile based on the collected additional information, and adjusting the identity vector based on the updated user profile; and after adjusting the current level of assurance, executing the requested transaction on the electronic platform.

20. The computer system of claim 17, wherein the member value vector determines a priority in call queues for calls related to recovery methods.

\* \* \* \* \*